United States Patent
Shiraishi et al.

(10) Patent No.: US 12,413,602 B2
(45) Date of Patent: Sep. 9, 2025

(54) COMMUNICATION CONTROL SYSTEM, STATUS SWITCHOVER SUPPORT APPARATUS, STATUS SWITCHOVER SUPPORT METHOD AND PROGRAM

(71) Applicant: NIPPON TELEGRAPH AND TELEPHONE CORPORATION, Tokyo (JP)

(72) Inventors: Masahiro Shiraishi, Tokyo (JP); Hiroki Ito, Tokyo (JP); Asami Miyajima, Tokyo (JP); Yoshihito Oshima, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 691 days.

(21) Appl. No.: 17/781,550

(22) PCT Filed: Dec. 5, 2019

(86) PCT No.: PCT/JP2019/047599
§ 371 (c)(1),
(2) Date: Jun. 1, 2022

(87) PCT Pub. No.: WO2021/111576
PCT Pub. Date: Jun. 10, 2021

(65) Prior Publication Data
US 2022/0417256 A1 Dec. 29, 2022

(51) Int. Cl.
*H04L 9/40* (2022.01)

(52) U.S. Cl.
CPC .................. *H04L 63/1408* (2013.01)

(58) Field of Classification Search
CPC ............... H04L 47/00; H04L 63/1408
See application file for complete search history.

(56) References Cited

U.S. PATENT DOCUMENTS

| 12,238,120 B1 * | 2/2025 | Werth ................. H04L 63/1416 |
| 2019/0294794 A1 * | 9/2019 | Okabe .................... G16Z 99/00 |

FOREIGN PATENT DOCUMENTS

JP 6577442 B2 9/2019

\* cited by examiner

*Primary Examiner* — Theodore C Parsons

(57) ABSTRACT

A communication control system includes: a state switching support apparatus including a processor; and a communication control apparatus to control communication to a protection target according to its state. The processor executes generating grid point data in which a grid point group representing exhaustive communications to the target is associated with states corresponding to grid points of the grid point group using previously collected data related to the communication; generating, by using the grid point data and data related to current communication, generating a state distribution representing a distribution of the states in a vicinity of a point represented by the data related to current communication in the grid point group; predicting a time when the state transitions to another state from a change in the state distribution from past to present; and transmitting an instruction to switch the state to the communication control apparatus at the predicted time.

8 Claims, 15 Drawing Sheets

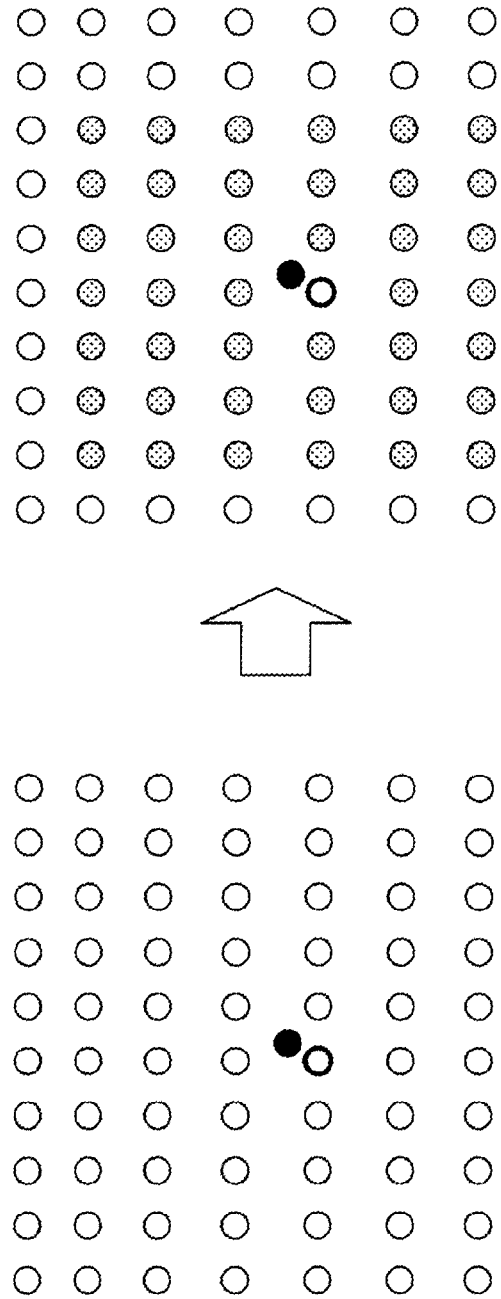
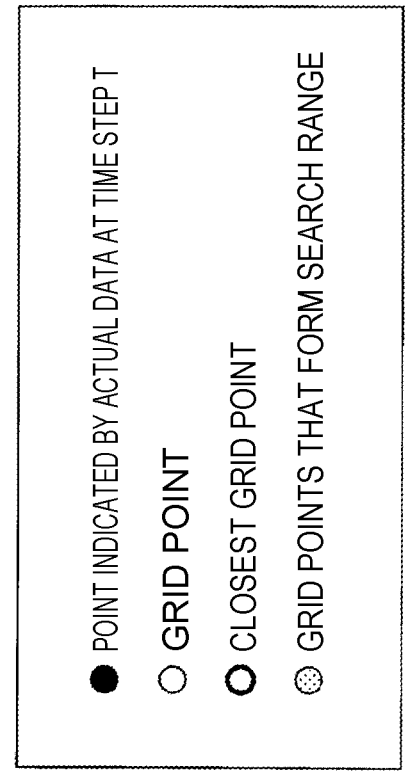
Fig. 7

Fig. 8
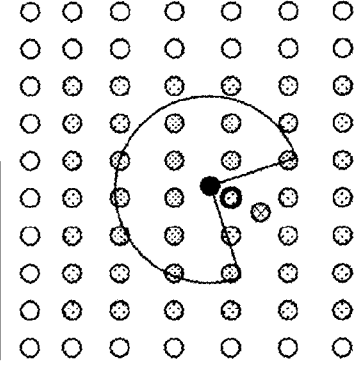
FAN SHAPE
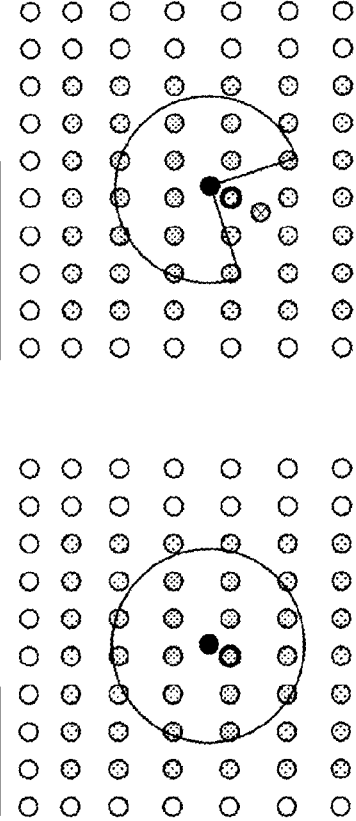
CIRCLE
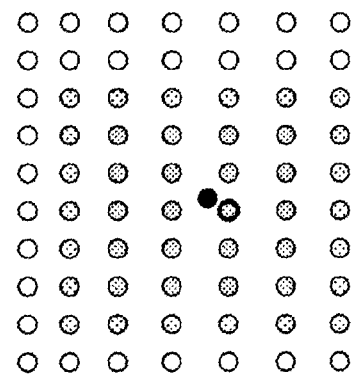
QUADRANGLE
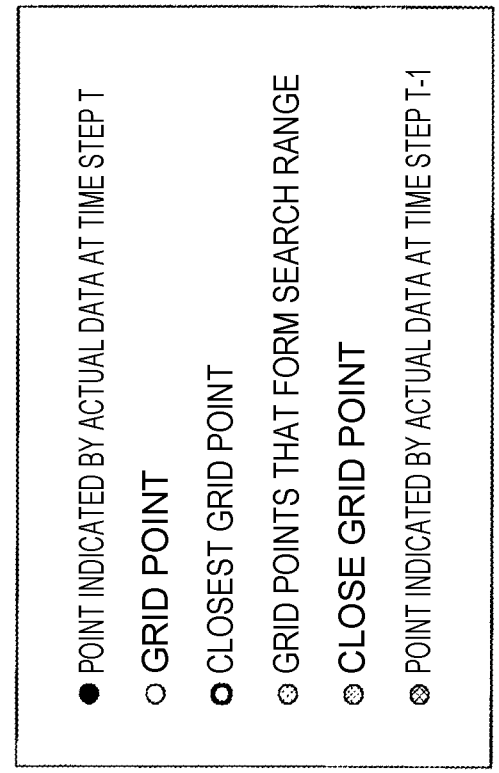
- ● POINT INDICATED BY ACTUAL DATA AT TIME STEP T
- ○ GRID POINT
- ◎ CLOSEST GRID POINT
- ◉ GRID POINTS THAT FORM SEARCH RANGE
- ◉ CLOSE GRID POINT
- ⊗ POINT INDICATED BY ACTUAL DATA AT TIME STEP T-1

Fig. 14

| No. | TRANSITION SOURCE | TRANSITION DESTINATION | TIMING | NUMBER OF SHIFTS [STEPS] | ALLOWABLE ERROR [STEPS] | COMMAND (SWITCHING CONTROL CONDITION) |
|---|---|---|---|---|---|---|
| 1 | STANDBY | IN OPERATION | BEFORE SWITCHING | 50 | 5 | #telnet xxx.xxx |
| 2 | IN OPERATION | IN HIGH OPERATION | BEFORE SWITCHING | 10 | 1 | #sh ./~~.sh |
| 3 | IN HIGH OPERATION | IN OPERATION | ON TIME | - | - | #sh ./~~.sh |
| 4 | IN OPERATION | STANDBY | AFTER SWITCHING | 100 | 1 | #telnet xxx.xxx |
| ⋮ | ⋮ | ⋮ | ⋮ | ⋮ | ⋮ | ⋮ |

COMMUNICATION CONTROL SYSTEM, STATUS SWITCHOVER SUPPORT APPARATUS, STATUS SWITCHOVER SUPPORT METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/047599, filed on 5 Dec. 2019, the disclosure of which is hereby incorporated herein by reference in its entirety.

TECHNICAL FIELD

The present invention relates to a communication control system, a state switching support apparatus, a state switching support method, and a program.

BACKGROUND ART

In a network in which a plurality of computers communicate with each other, there has conventionally been known a communication control apparatus that protects computers and the like from unauthorized access and attacks (e.g., Patent Literature 1). In such a communication control apparatus, blocking of communication or the like is performed by applying an appropriate rule from a list of a plurality of rules according to the state of a protection target (i.e., a computer or the like). Note that a rule defines a condition of a communication determined as an attack or a condition of a communication determined to be normal and how to deal with the communications.

CITATION LIST

Patent Literature

Patent Literature 1: Japanese Patent No. 6577442

SUMMARY OF THE INVENTION

Technical Problem

Here, in order for the communication control apparatus to apply an appropriate rule, the state of the protection target recognized by the communication control apparatus needs to be matched with the actual state of the protection target. However, in the above-mentioned conventional technique, after the state of the protection target has switched, a plurality of processes need to be executed before the communication control apparatus recognizes this switched state, so there is a lag in time (time lag) until the communication control apparatus recognizes the actual state of the protection target. In other words, there is a time difference between the switching time of the actual state of the protection target and the switching time of the state recognized by the communication control apparatus.

For this reason, inappropriate rules may be applied temporarily, for example, a communication that should be determined as an attack is determined to be normal, or a communication that should be determined to be normal is determined as an attack.

One embodiment of the present invention has been made in view of the above points, and aims to reduce a time difference upon switching the state of a protection target.

Means for Solving the Problem

In order to achieve the above purpose, a communication control system according to one embodiment is a communication control system including a communication control apparatus that controls communication to a protection target according to a state of the protection target, the communication control system including: grid point generation means for generating grid point data in which a grid point group representing exhaustive communications to the protection target is associated with states corresponding to grid points of the grid point group using previously collected data related to the communication; state distribution generation means for, using the grid point data and data related to current communication, generating a state distribution representing a distribution of the states in a vicinity of a point represented by the data related to current communication in the grid point group included in the grid point data; prediction means for predicting a time at which the state transitions to another state from a change in the state distribution from past to present; and switching instruction means for transmitting an instruction to switch the state to the communication control apparatus at the predicted time.

Effects of the Invention

It is possible to reduce a time difference upon switching the state of a protection target.

BRIEF DESCRIPTION OF DRAWINGS

FIG. 7 is a diagram for describing an example of a search range for close grid points.

FIG. 8 is a diagram for describing an example of a close grid point group.

FIG. 14 is a diagram showing an example of switching control conditions stored in a switching control condition DB.

DESCRIPTION OF EMBODIMENTS

Hereinafter, embodiments of the present invention will be described. Each embodiment below will describe a communication control system 1 that, when the state of a protection target has switched, can reduce the time difference that is a duration until a communication control apparatus recognizes this switched state.

First Embodiment

A first embodiment will be described below.

<Overall Configuration>

Figure 1:
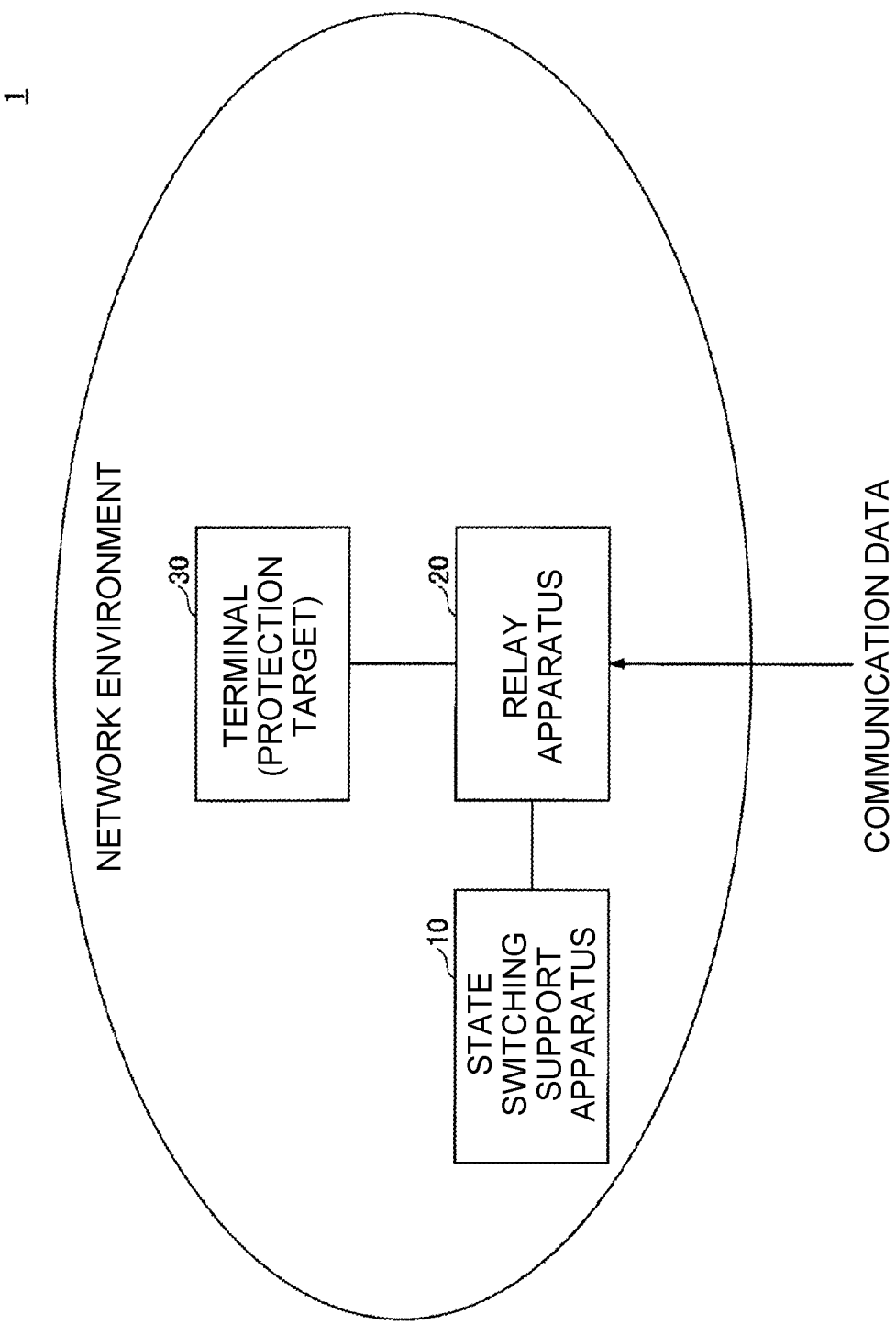
FIG. 1 is a diagram showing an example of an overall configuration of a communication control system according to a first embodiment.

First, an overall configuration of the communication control system 1 according to this embodiment will be described with reference to FIG. 1. FIG. 1 is a diagram showing an example of the overall configuration of the communication control system 1 according to the first embodiment.

As shown in FIG. 1, the communication control system 1 according to this embodiment is a system built in any network environment, and includes a state switching support apparatus 10, one or more relay apparatuses 20, and one or more terminals 30.

A relay apparatus 20 is an apparatus or equipment that applies an appropriate rule from a plurality of rules according to the state of a protection target, and performs communication control such as blocking of communication data according to this rule. That is, the relay apparatus 20 is an apparatus or equipment having such a communication control function (e.g., a router, a gateway, or an IPS (intrusion prevention system)). Note that the rule is information that defines a condition of a communication determined as an attack or a condition of a communication determined to be normal and how to deal with the communications, as described above.

Further, the relay apparatus 20 mirrors communication data addressed to a terminal 30 (protection target) or communication data from the terminal 30 (protection target) to another terminal 30, and transmits it to the state switching support apparatus 10. Note that the relay apparatus 20 can also receive an instruction to switch the rule from the outside (e.g., a terminal with which it can communicate via a network).

The terminal 30 is a computer to be protected by the communication control function provided in the relay apparatus 20. Note that examples of the terminal 30 include, for example, a PC (personal computer), a smartphone, and a tablet terminal. However, the protection target is not limited to the terminal 30, and any equipment or apparatus (e.g., a general-purpose server, industrial equipment, an in-vehicle device, or IoT (Internet of Things) equipment) may be the protection target.

Here, it is assumed that the protection target has a plurality of states, and each of the state transitions according to predetermined conditions. The states include, for example, "standby" indicating that the terminal 30 is on standby, "in operation" indicating that the terminal 30 is in normal operation, and "in high operation" indicating that the terminal 30 is executing high-load processing. Note that what states the protection target has and according to what conditions the state transitions may differ depending on the purpose or the like of protection targets or the system including these protection targets. However, it is assumed that the states of the protection target can be classified by a state classifier described later.

The state switching support apparatus 10 is a computer or computer system that predicts a time at which the state of the protection target switches using communication data received from the relay apparatus 20, and transmits a state switching instruction to the relay apparatus 20 at the predicted time. Note that in this embodiment, the actual state of the protection target is also referred to as "protection target state", and the state of the protection target recognized by the relay apparatus 20 (i.e., the state of the protection target held by the relay apparatus 20) is also referred to as "recognized state".

Here, the state switching support apparatus 10 according to this embodiment predicts a time at which the protection target state switches through the following procedures (1) to (4), and transmits the state switching instruction to the relay apparatus 20.

(1) Data prepared in advance (communication data, data representing its feature values, data including both of them, or data obtained by dimensionally compressing this data, which are hereinafter also referred to as "previously prepared data") and a state classifier trained in advance to estimate the protection target state from the data are used to generate a grid point list in which exhaustive data values (grid points) that can be transmitted/received by the protection target are associated with the states of the protection state at those times.

(2) The grid point list is used to generate a distribution of states associated with grid points close to the value of data that is, for example, received by the protection target (hereinafter also referred to as "state distribution").

(3) The time at which the protection target state switches is predicted from the amount of change in the state distribution from the past to the present.

(4) A state switching instruction is transmitted to the relay apparatus 20 at the predicted time (hereinafter also referred to as "predicted switching time"). Thereby, the recognized state switches to the protection target state, so that the recognized state matches the protection target state.

Here, (1) described above is a process in a "preparation phase" that needs to be performed in advance before the state switching support apparatus 10 is operated. (2) to (4) described above are processes in an "operation phase" that are executed while the state switching support apparatus 10 is operated.

Note that the configuration of the communication control system 1 shown in FIG. 1 is an example, and it may have other configurations. For example, the state switching support apparatus 10 and the relay apparatus 20 may be configured integrally.

<Hardware Configuration>

Figure 2:
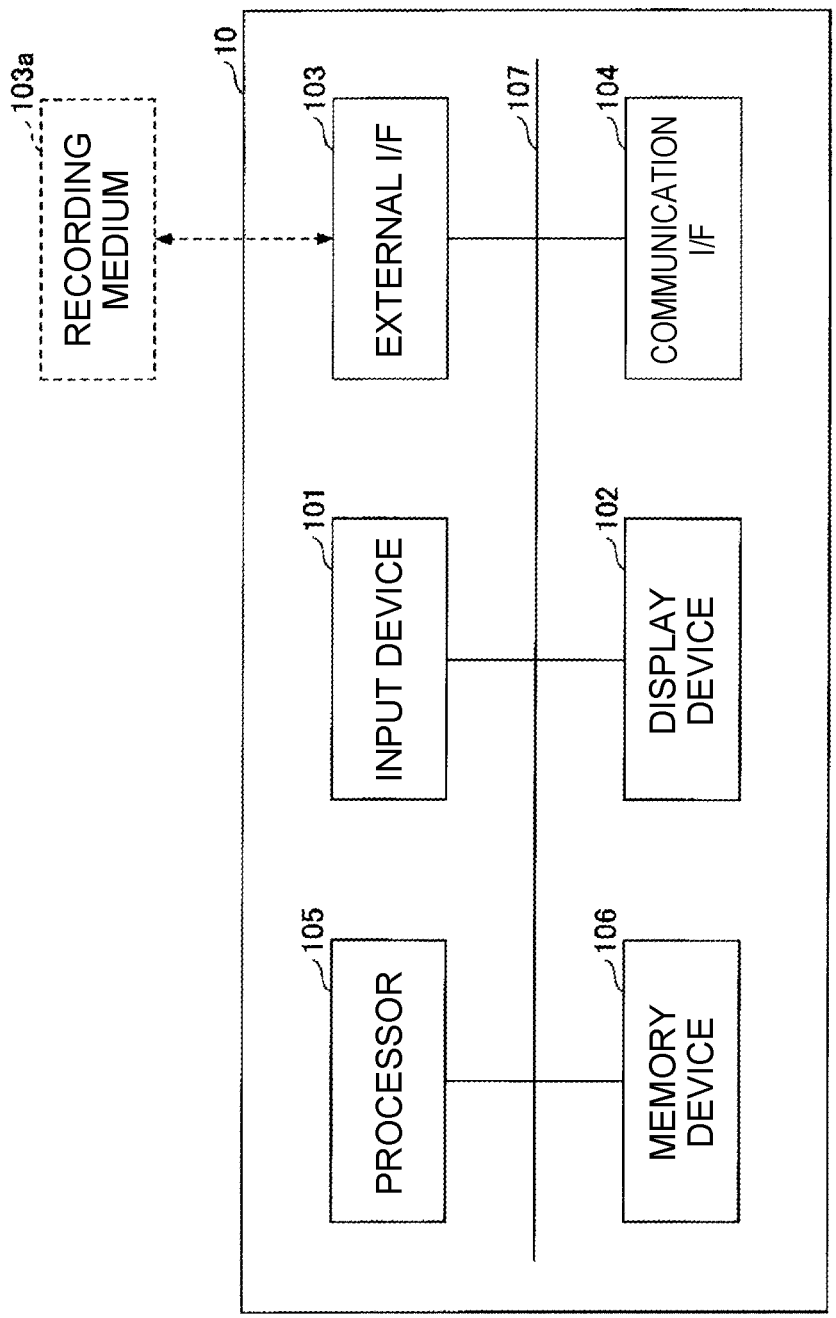
FIG. 2 is a diagram showing an example of a hardware configuration of a state switching support apparatus according to the first embodiment.

Next, a hardware configuration of the state switching support apparatus 10 according to this embodiment will be described with reference to FIG. 2. FIG. 2 is a diagram showing an example of a hardware configuration of the state switching support apparatus 10 according to the first embodiment.

As shown in FIG. 2, the state switching support apparatus 10 according to the first embodiment can be implemented by a general computer or computer system, and has an input device 101, a display device 102, an external I/F 103, a communication I/F 104, a processor 105, and a memory device 106. These pieces of hardware are communicably connected to each other via a bus 107.

The input device 101 is, for example, a keyboard and a mouse, or a touch panel. The display device 102 is, for example, a display. Note that the state switching support apparatus 10 may not have at least one of the input device 101 and the display device 102.

The external I/F 103 is an interface with external devices. The external devices include a recording medium 103a and the like. The state switching support apparatus 10 can perform reading from and writing to the recording medium 103a via the external I/F 103. Note that examples of the recording medium 103a include, for example, a CD (compact disc), a DVD (digital versatile disk), an SD memory card (secure digital memory card), and a USB (universal serial bus) memory card.

The communication I/F 104 is an interface for the state switching support apparatus 10 to perform data communication with other devices (e.g., the relay apparatus 20) or the like. The processor 105 is, for example, one of various arithmetic devices such as a CPU (central processing unit) and a GPU (graphics processing unit). The memory device 106 is, for example, one of various storage devices such as an HDD (hard disk drive), an SSD (solid state drive), a RAM (random access memory), a ROM (read only memory), and a flash memory.

The state switching support apparatus 10 according to this embodiment can implement various processes described later by having the hardware configuration shown in FIG. 2. Note that the hardware configuration shown in FIG. 2 is an example, and the state switching support apparatus 10 may have other hardware configurations. For example, the state switching support apparatus 10 may have a plurality of processors 105, or may have a plurality of memory devices 106.

<Functional Configuration>

Figure 3:
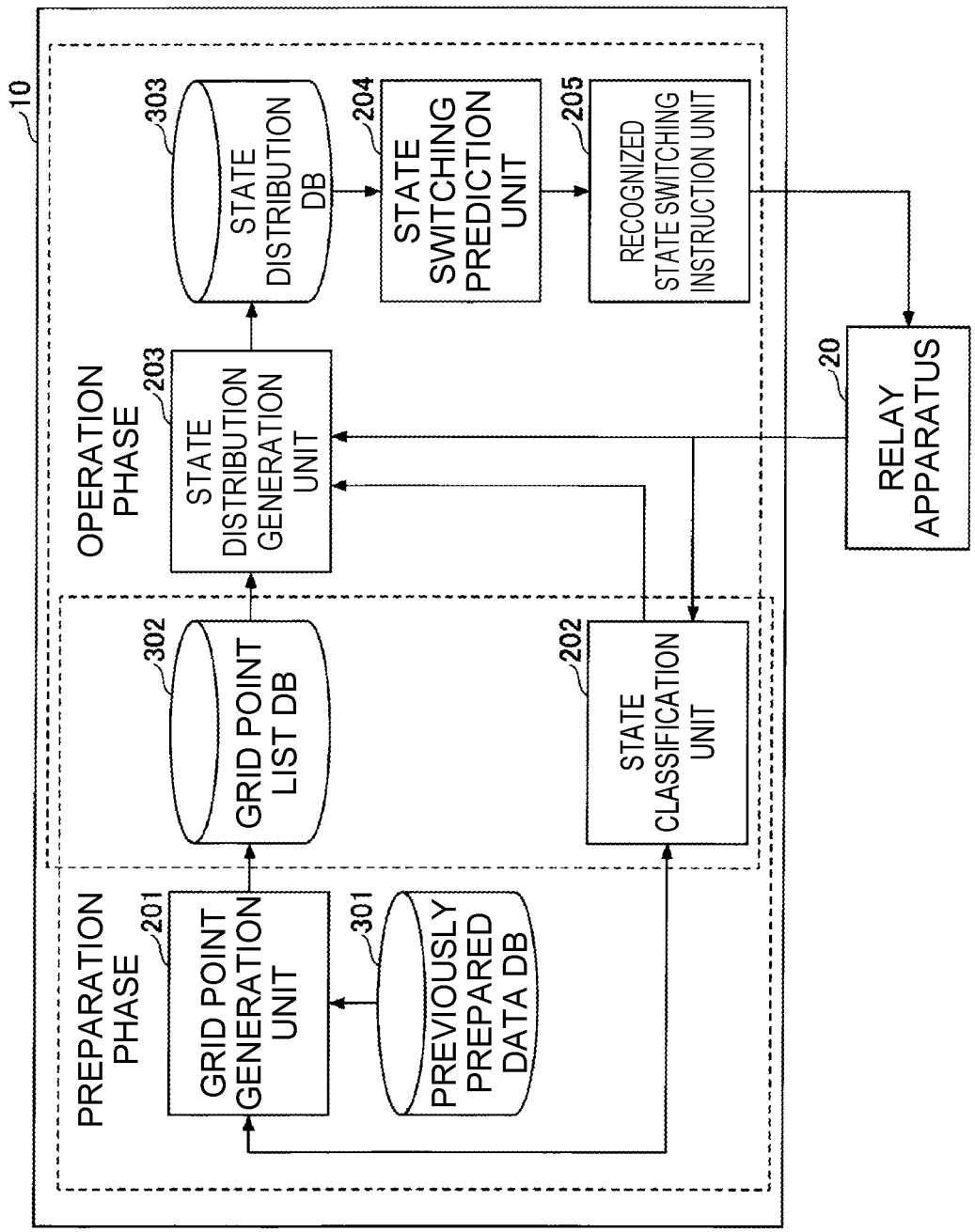
FIG. 3 is a diagram showing an example of a functional configuration of the state switching support apparatus according to the first embodiment.

Next, a functional configuration of the state switching support apparatus 10 according to this embodiment will be described with reference to FIG. 3. FIG. 3 is a diagram showing an example of a functional configuration of the state switching support apparatus 10 according to the first embodiment.

As shown in FIG. 3, the state switching support apparatus 10 according to this embodiment has a grid point generation unit 201, a state classification unit 202, a state distribution generation unit 203, a state switching prediction unit 204, and a recognized state switching instruction unit 205. Each of these functional units is implemented by, for example, a process that one or more programs installed in the state switching support apparatus 10 causes the processor 105 to execute.

Further, the state switching support apparatus 10 according to this embodiment has a previously prepared data DB 301, a grid point list DB 302, and a state distribution DB 303. Each of these DBs can be implemented using, for example, the memory device 106 or the like. Note that at least one DB of these DBs may be implemented using, for example, a storage device connected to the state switching support apparatus 10 via a network (e.g., a database server or the like).

In the preparation phase, the grid point generation unit 201 generates a grid point list using the previously prepared data stored in the previously prepared data DB 301. The grid point list generated by the grid point generation unit 201 is stored in the grid point list DB 302.

In the preparation phase, the state classification unit 202 estimates a value indicating the state of the protection target (hereinafter also referred to as "state value") from the data indicating each grid point included in the grid point list. Further, in the operation phase, the state classification unit 202 estimates the state value from the actual data described later. Note that the data indicating each grid point, the previously prepared data, and the actual data each have the same data items, as described later.

Here, the state classification unit 202 is implemented by, for example, any state classifier that is trained in advance using a supervised learning technique. Further, the classification technique of the state classifier is not limited particularly. As the classification technique of the state classifier, for example, logistic regression, support vector machine, decision tree, and random forest can be used.

In the operation phase, the state distribution generation unit 203 generates a state distribution using the grid point list stored in the grid point list DB 302, and communication data received from the relay apparatus 20 (alternatively, data representing a feature value of this communication data, data including both of them, or data obtained by dimensionally compressing this data). The state distribution generated by the state distribution generation unit 203 is stored in the state distribution DB 303. Note that any of the communication data received from the relay apparatus 20, the data representing its feature value, the data including both of them, or the data obtained by dimensionally compressing this data is also referred to as "actual data".

Here, it is assumed that the previously prepared data and the actual data have the same data items. That is, for example, when communication data is used as the previously prepared data, communication data is also used as the actual data. Similarly, for example, when data representing a feature value of communication data is used as the previously prepared data, data representing the feature value of communication data is also used as the actual data. Similarly, for example, when data including both communication data and data representing a feature value is used as the previously prepared data, data including both communication data and data representing the feature value is also used as the actual data. Similarly, for example, when data obtained by dimensionally compressing data including both communication data and data representing a feature value is used as the previously prepared data, data obtained by dimensionally compressing data including both communication data and data representing the feature value is also used as the actual data.

In the operation phase, the state switching prediction unit 204 predicts the time at which the protection target state switches (hereinafter also referred to as "predicted switching time") using the state distribution stored in the state distribution DB 303.

In the operation phase, the recognized state switching instruction unit 205 transmits a state switching instruction to the relay apparatus 20 at the predicted switching time.

The previously prepared data DB 301 stores the previously prepared data. As described above, the previously prepared data refers to communication data prepared in advance, data representing its feature value, data including both of them, or data obtained by dimensionally compressing this data. Letting I be the number of data items (the dimensionality), the previously prepared data at time step t representing time is expressed as $X_t=(x_t^1, x_t^2, x_t^3, \ldots, x_t^I)$. Note that for data representing a feature value of communication data, it is sufficient to use any feature value extractor (e.g., a low-pass filter or the like) that receives the communication data as input. Further, as a dimension compressor, for example, a dimension compressor using the techniques of principal component analysis or a dimension compressor generated using an auto encoder can be used.

Here, although any dimensionality can be employed as the number of data items (i.e., the dimensionality) of the previously prepared data, for example, about two or three dimensions are preferable, judging from the balance between the time required for estimating state values at the time of generating the state distribution and their estimation accuracy. Therefore, in the following, as an example, a description will be given assuming that the previously prepared data is two-dimensional data obtained by dimensionally compressing data including both communication data and data representing its feature value. Therefore, it is assumed that the actual data is also two-dimensional data obtained by dimensionally compressing data including both communication data and data representing its feature value.

The grid point list DB 302 stores the grid point list generated by the grid point generation unit 201. The grid point list is a list in which the grid points generated from the previously prepared data are associated with the state values at these grid points.

The state distribution DB 303 stores the state distribution generated by the state distribution generation unit 203. The state distribution refers to a distribution of state values represented by grid points located near the point indicated by the actual data within the distribution of the state values represented by the grid point list.

<Details of Processes>

Next, the details of processes in the state switching support apparatus 10 according to this embodiment will be described.

<<Preparation Phase>>

Figure 4:
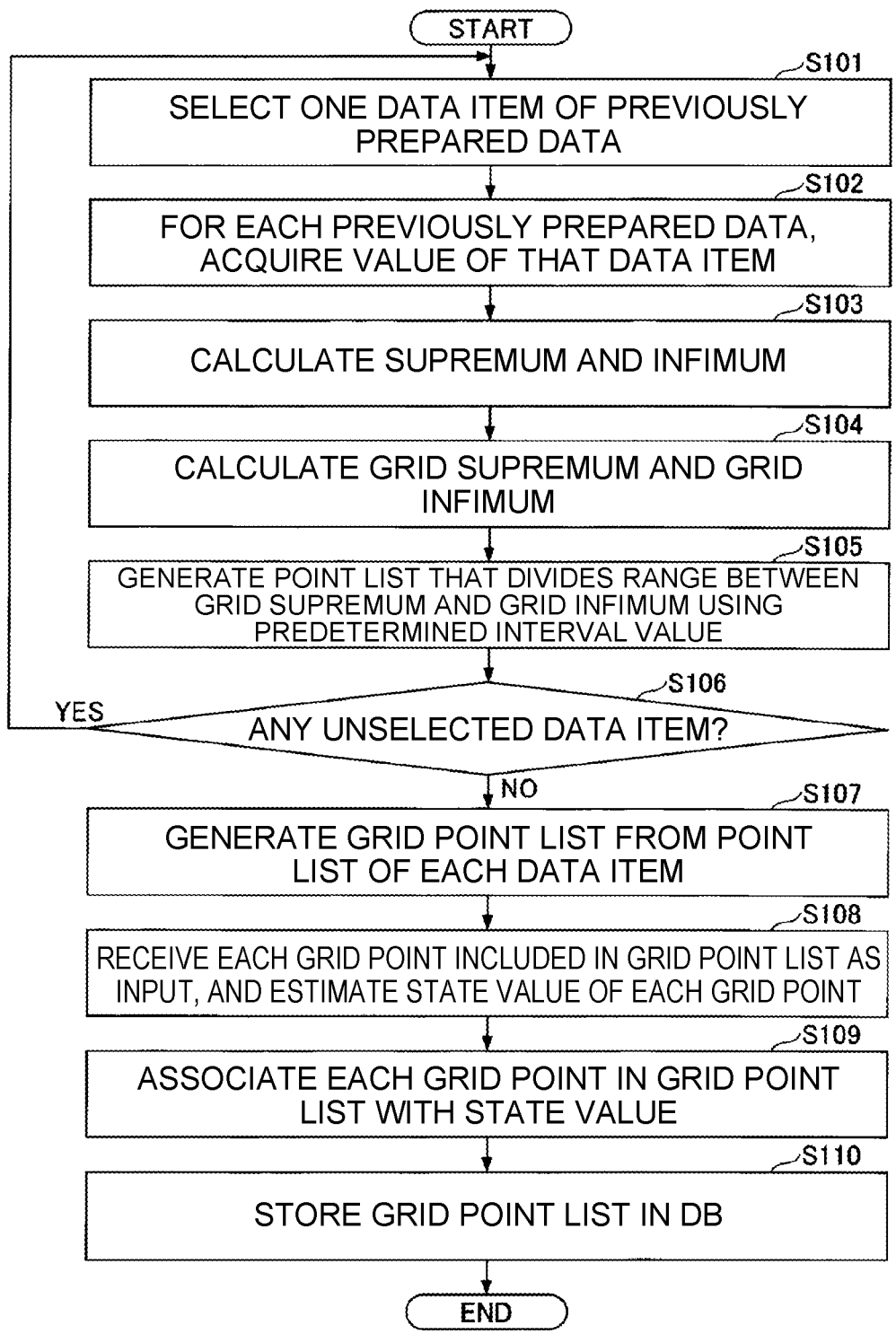
FIG. 4 is a flowchart showing an example of a grid point list generation process according to the first embodiment.

First, a grid point list generation process executed in the preparation phase will be described with reference to FIG. 4. FIG. 4 is a flowchart showing an example of the grid point list generation process according to the first embodiment.

The grid point generation unit 201 selects one data item of the previously prepared data (step S101). For example, when a data item 1 and a data item 2 are included in the previously prepared data, the grid point generation unit 201 selects one data item among the data item 1 and the data item 2. In the following, for simplicity, the previously prepared data at time step t is expressed as $X_t=(x_t, y_t)$, and it is assumed that the data item $x_t$ has been selected in this step.

Next, the grid point generation unit 201 acquires the value of the data item selected in step S101 above for the previously prepared data at each time step (step S102). For example, when the previously prepared data $X_t$ at time step $t=1, \ldots, 100$ is stored in the previously prepared data DB 301, the grid point generation unit 201 acquires $x_1, x_2, \ldots, x_{100}$.

Next, the grid point generation unit 201 calculates the supremum and the infimum for the values acquired in step S102 above (step S103). For example, the grid point generation unit 201 sets the maximum value of $x_1, x_2, \ldots, x_{100}$ as the supremum $x_{sup}$, and the minimum value of $x_1, x_2, \ldots, x_{100}$ as the infimum $x_{inf}$.

Next, the grid point generation unit 201 calculates the grid supremum and the grid infimum using a preset allowable range value and the supremum and the infimum calculated in step S103 above (step S104). For example, letting r be an allowable range value, the grid point generation unit 201 sets the grid supremum to $x_{gsup}=x_{sup}+r$, and the grid infimum to $x_{ginf}=x_{inf}-r$. Note that the allowable range value may be set in common for the data items of the previously prepared data, or may be set for each data item. Further, the allowable range value for calculating the grid supremum may be different from the allowable range value for calculating the grid infimum.

Next, the grid point generation unit 201 generates a point list that divides the range between the grid supremum and the grid infimum using a preset interval value and the grid supremum and the grid infimum calculated in step S104 above (step S105). For example, letting $\Delta$ be the interval value, the grid point generation unit 201 generates a point list $\{x_{ginf}, x_{ginf}+\Delta, x_{ginf}+2\Delta, x_{ginf}+3\Delta, \ldots, x_{gsup}-2\Delta, x_{gsup}-\Delta, x_{gsup}\}$. Thereby, a list of points from the grid infimum to the grid supremum is generated at intervals of the interval value $\Delta$. In the following, for simplicity, let $a_1=x_{ginf}$, $a_2=x_{ginf}+\Delta, \ldots, a_k=x_{gsup}$, and let the point list for the data item $x_t$ be $\{a_1, a_2, \ldots, a_k\}$ (where k is an integer of 2 or more).

Next, the grid point generation unit 201 determines whether there is any data item not selected in step S101 above among the data items of the previously prepared data (step S106). When there is an unselected data item, the grid point generation unit 201 returns to step S101 above. Thereby, a point list for each data item of the previously prepared data is obtained. For example, by executing the processes of steps S102 to step S105 above for the data item $y_t$, a point list $\{b_1, b_2, \ldots, b_k\}$ for the data item $y_t$ is obtained.

When it is not determined in step S106 above that there is an unselected data item, the grid point generation unit 201 generates a grid point list from the point list for each data item (step S107). That is, the grid point generation unit 201 generates a grid point list in which a set of points represented by all combinations of the indexes of the point lists is set as one grid point. For example, the grid point generation unit 201 generates a grid point list in which a set of points represented by all combinations $\{(1, 1), \ldots, (1, k), (2, 1), \ldots, (2, k), \ldots, (k, k)\}$ of the indexes of the point list $\{a_1, a_2, \ldots, a_k\}$ for the data item $x_t$ and the point list $\{b_1, b_2, \ldots, b_k\}$ for the data item $y_t$ is set as one grid point. In this case, the grid point list is $\{(a_1, b_1), \ldots, (a_1, b_k), (a_2, b_1), \ldots, (a_2, b_k), \ldots, (a_k, b_k)\}$.

Thereby, letting I be the number of data items, a list of grid points in an I-dimensional space is obtained. This grid point list is exhaustive data values (grid points) that can be transmitted/received by the protection target.

Next, the state classification unit 202 receives, as input, data indicating each grid point included in the grid point list generated in step S107 above, and estimates the state value at the grid point indicated by the data from these data (step S108). For example, the state classification unit 202 estimates the state value from the data indicating each of $(a_1, b_1), (a_2, b_2), \ldots, (a_k, b_k)$. In the following, the state value estimated from the data indicating $(a_i, b_i)$ is denoted as $s_i$.

Next, the grid point generation unit 201 associates each grid point included in the grid point list with the state value estimated from the grid point among the state values obtained in step S108 above (step S109). For example, the grid point generation unit 201 associates the grid point $(a_i, b_i)$ with the state value $s_i$. Thereby, for example, a grid point list $\{(a_1, b_1, s_1), (a_2, b_2, s_2), \ldots, (a_k, b_k, s_k)\}$ is obtained.

Finally, the grid point generation unit 201 stores the grid point list obtained in step S108 above in the grid point list DB 302 (step S110). Thereby, letting I be the number of data items of the previously prepared data, the grid point list in which the grid points in the I-dimensional space are associated with the state values at the grid points is stored in the grid point list DB 302.

<<Operation Phase>>

Next, processes executed in the preparation phase will be described. In the following preparation phase, it is assumed that actual data has been transmitted from the relay apparatus 20 to the state switching support apparatus 10 at time step T indicating the current time.

Figure 5:
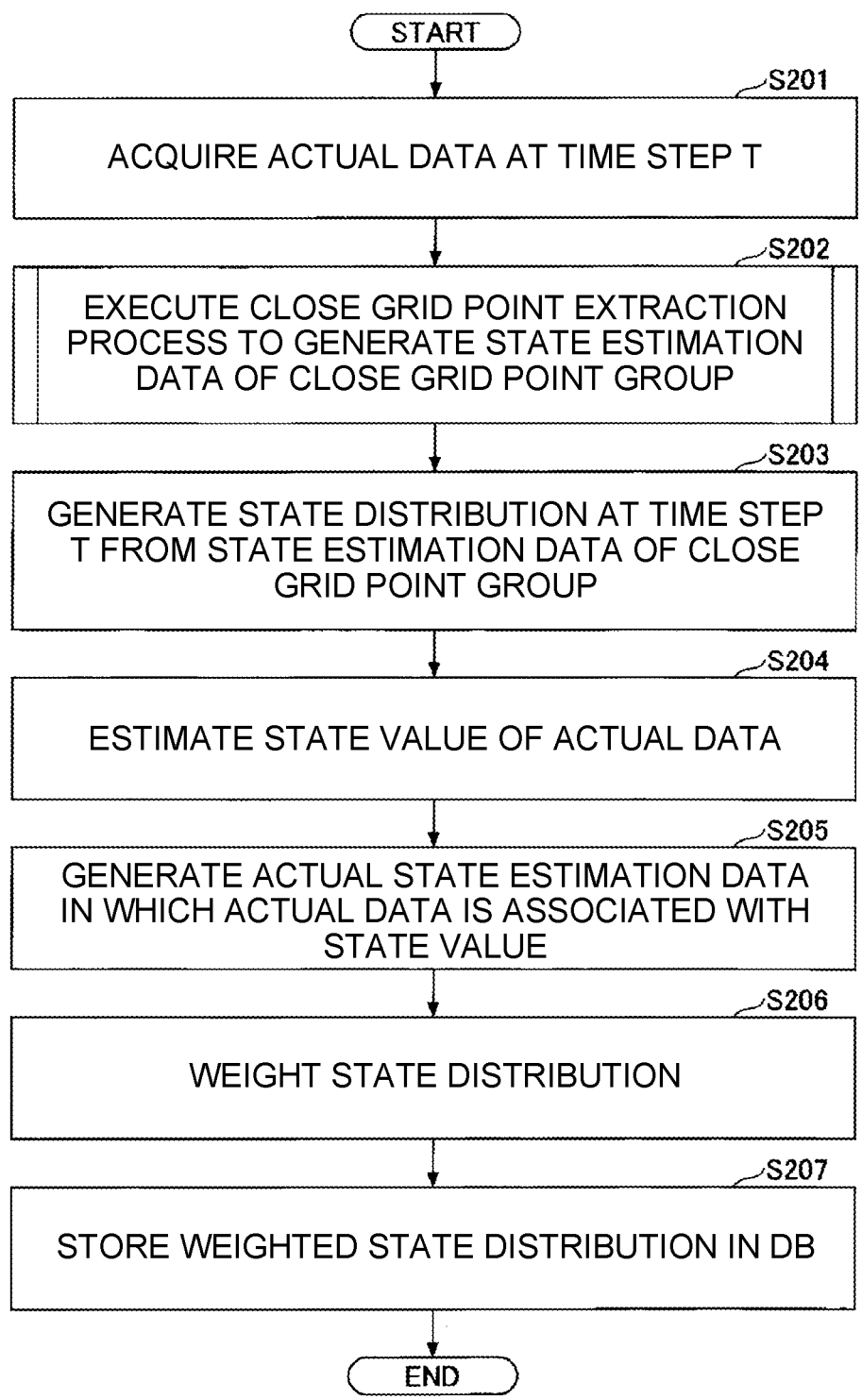
FIG. 5 is a flowchart showing an example of a state distribution generation process according to the first embodiment.

First, a state distribution generation process for generating a state distribution at time step T using the grid point list will be described with reference to FIG. 5. FIG. 5 is a flowchart showing an example of the state distribution generation process according to the first embodiment.

The state distribution generation unit 203 acquires the actual data at time step T (step S201). Note that the actual data has the same data items as the previously prepared data as described above. Therefore, the actual data is expressed as $X_T = (x_T, y_T)$ in the following.

Figure 6:
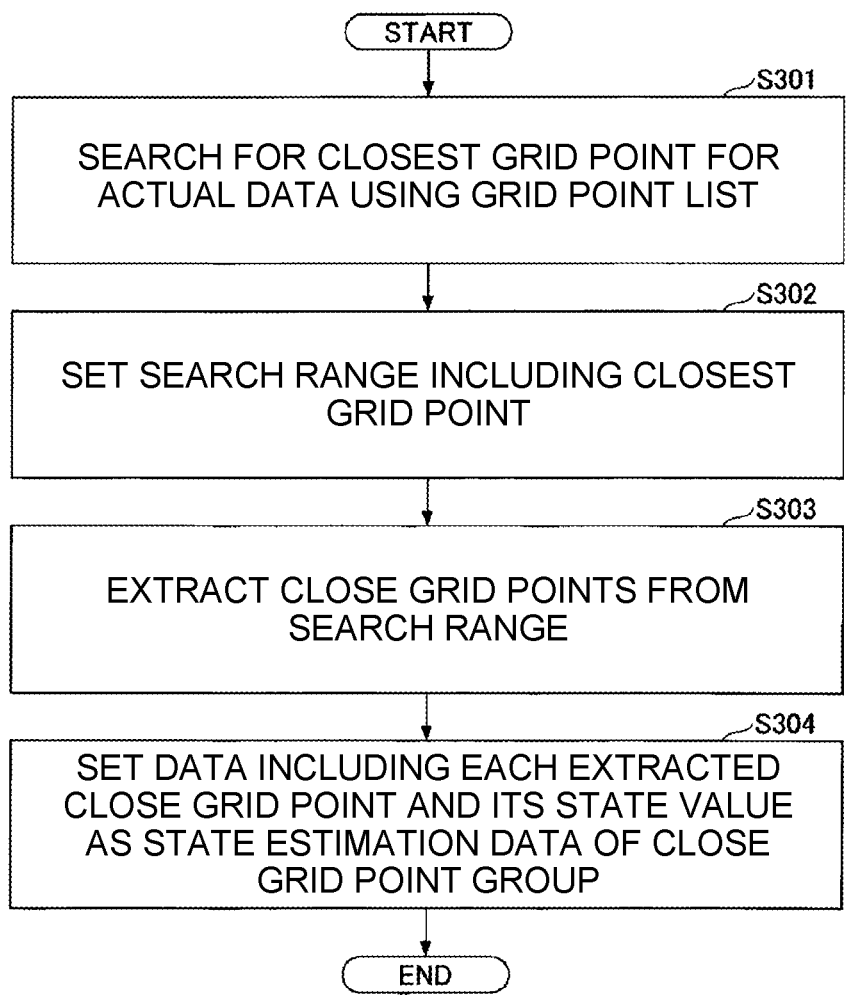
FIG. 6 is a flowchart showing an example of a close grid point extraction process according to the first embodiment.

Next, the state distribution generation unit 203 executes a close grid point extraction process to generate state estimation data of a close grid point group (step S202). Here, the close grid point extraction process in this step will be described with reference to FIG. 6. FIG. 6 is a flowchart showing an example of the close grid point extraction process according to the first embodiment.

The state distribution generation unit 203 searches for the closest grid point for the actual data using the grid point list stored in the grid point list DB 302 (step S301). The closest grid point refers to the grid point that is the closest to the point indicated by the actual data among the grid points included in the grid point list. That is, the closest grid point refers to, for example, the closest grid point $(a_{min}, b_{min})$ that is closest in distance to the point $(x_T, y_T)$ indicated by the actual data among the grid points $(a_i, b_i)$ included in the grid point list. In this case, as shown on the left of FIG. 7, the closest grid point refers to the grid point that is closest in distance to the point indicated by the actual data in the grid point group represented by the grid points included in the grid point list in the two-dimensional space.

Here, it is sufficient for the state distribution generation unit 203 to search for the closest grid point using, for example, the Euclidean distance as the distance based on any search algorithm (e.g., linear search, spatial decomposition search or the like). Note that any distance other than the Euclidean distance may be used.

Next, the state distribution generation unit 203 sets a search range including the closest grid point searched for in step S301 above for the grid point group represented by the grid points included in the grid point list (step S302). For example, as shown on the right of FIG. 7, the state distribution generation unit 203 sets a rectangular area with a predetermined range including the closest grid point as the search range. Note that it is sufficient to set the length of each side (in the case of a two-dimensional space, the width and height) of the rectangular area representing the search range in any manner.

Next, the state distribution generation unit 203 extracts close grid points from within the search range set in step S302 above (step S303). Here, it is sufficient for the state distribution generation unit 203 to extract grid points included in any area within the search range that includes the point indicated by the actual data (this area is also referred to as "extraction area") as the close grid points. Hereafter, some examples of extracting close grid points will be shown.

Extraction Example 1

As shown on the left of FIG. 8, any quadrangular (rectangular) area is set as the extraction area, and the grid points included in this extraction area are extracted as close grid points.

Extraction Example 2

As shown in the central figure in FIG. 8, a circular area having a predetermined radius centered on the point indicated by the actual data is set as the extraction area, and the grid points included in this extraction area are extracted as close grid points.

Extraction Example 3

As shown on the right of FIG. 8, in consideration of the point indicated by the actual data at time step T-1, a fan-shaped area obtained by excluding an area in the direction in which this point is present within the circular area described in the above extraction example 2 is set as the extraction area, and the grid points included in this extraction area are extracted as close grid points. Here, for example, when the straight line passing through the point indicated by the actual data at time step T and the point indicated by the actual data at time step T-1 is expressed as L: $y = m_1 x + n_1$, and the straight line obtained by inclining the straight line L by $+\theta$ around the point indicated by the actual data at time step T is expressed as PL: $y = m_2 x + n_2$, $\tan \theta = \tan(\theta_1 - \theta_2) = (\tan \theta_1 - \tan \theta_2)/(1 + \tan \theta_1 \tan \theta_2) = (m_1 - m_2)/(1 + m_1 m_2)$ holds from the addition theorem, and therefore $\theta$ is determined, so that the straight line PL can be determined. Since the straight line obtained by inclining the straight line L in the $-\theta$ direction can also be determined in the same manner, the above fan-shaped area can be identified. Note that since the calculation is impossible when the slope of the straight line L is zero, a value close to zero is used as the slope of the straight line L if the slope of the straight line L is zero.

Next, the state distribution generation unit 203 sets data including each close grid point extracted in step S303 above and a state value associated with each of these close grid points as state estimation data of the close grid point group (step S304). That is, for example, letting each grid point extracted in step S303 above be $\{(a_j, b_j); j=1, \ldots, m\}$, the state estimation data of the grid point group is expressed as $\{(a_j, b_j, s_j; j=1, \ldots, m\}$.

The description returns to FIG. 5. Subsequently to step S202, the state classification unit 202 generates a state distribution at time step T from the state estimation data of the close grid point group (step S203). The state classification unit 202 calculates, for each state value, the number of grid points associated with this state value, and associates the state value with the number to generate the state distribution. For example, assuming that the protection target can take three states, let $s_j \in \{0, 1, 2\}$. In this case, the state classification unit 202 calculates each of the number $N_T$ of grid points $(a_j, b_j)$ associated with $s_j = 0$, the number $M_T$ of grid points $(a_j, b_j)$ associated with $s_j = 1$, and the number $L_T$ of grid points $(a_j, b_j)$ associated with $s_j = 2$ among the grid points $(a_j, b_j)$ included in the state estimation data of the close grid point group, and sets the state distribution at time step T as $D_T = \{(s=0, N_T), (s=1, M_T), (s=2, L_T)\}$. Note that s is the state value.

Next, the state classification unit 202 estimates a state value from the actual data acquired in step S201 above (step S204). For example, the state classification unit 202 estimates a state value $s_T$ from the actual data $X_T=(x_T, y_T)$.

Next, the state distribution generation unit 203 generates actual state estimation data in which the actual data is associated with the state value estimated in step S204 above (step S205). For example, the state distribution generation unit 203 generates actual state estimation data $(x_T, y_T, s_T)$ in which the actual data $X_T=(x_T, y_T)$ is associated with the state value $s_T$.

Next, the state distribution generation unit 203 weights the state distribution $D_T$ generated in step S203 above to generate a weighted state distribution $D_T$ (step S206). The state distribution generation unit 203 weight the state distribution $D_T$ by removing (setting to zero) the number corresponding to the state value included in the actual state estimation data generated in step S205 above among the numbers included in the state distribution $D_T$. For example, when the state value included in the actual state estimation data is $s_T=0$, the state distribution generation unit 203 sets $N_T=0$ to generate the weighted state distribution $D_T=\{(s=0, 0), (s=1, M_T), (s=2, L_T)\}$.

Note that the weighting described above is an example, and the state distribution generation unit 203 may perform weighting using other methods. For example, when there are a plurality of state classifiers, it is possible to implement the state classification unit 202 using each of the plurality of state classifiers. Specifically, when there are a state classifier A using logistic regression, a state classifier B using support vector machine, a state classifier C using decision tree, and a state classifier D using random forest, it is possible to implement state classification units 202A-D using these state classifiers A-D. In this case, in the grid point list generation process of FIG. 4, a grid point list A generated using the state classification unit 202A, a grid point list B generated using the state classification unit 202B, a grid point list C generated using the state classification unit 202C, and a grid point list D generated using the state classification unit 202D are stored in the grid point list DB 302. Accordingly, in step S202 to step S203 described above, as the state distribution $D_T$ at time step T, a state distribution $D_T^A$ using the grid point list A, a state distribution $D_T^B$ using the grid point list B, a state distribution $D_T^C$ using the grid point list C, and a state distribution $D_T^D$ using the grid point list D are obtained.

Then, regarding these state distributions, for each same state value, a weighted sum of the numbers associated with the state value may be associated with the state value to generate a weighted state distribution. Specifically, for example, when $$D_T^A=\{(s=0,N_T^A),(s=1,M_T^A),(s=2,L_T^A)\},$$

$$D_T^B=\{(s=0,N_T^B),(s=1,M_T^B),(s=2,L_T^B)\},$$

$$D_T^C=\{(s=0,N_T^C),(s=1,M_T^C),(s=2,L_T^C)\},$$

and $$D_T^D=\{(s=0,N_T^D),(s=1,M_T^D),(s=2,L_T^D)\},$$

parameters a, b, c, d (such that a+b+c+d=1) that are preset according to the accuracy of each state classifier are used to calculate:

$$N_T=aN_T^A+bN_T^B+cN_T^C+dN_T^D,$$

$$M_T=aM_T^A+bM_T^B+cM_T^C+dM_T^D, \text{ and}$$

$$L_T=aL_T^A+bL_T^B+cL_T^C+dL_T^D,$$

and the weighted state distribution $D_T=\{(s=0, N_T), (s=1, M_T), (s=2, L_T)\}$ may be used. Still further, for this weighted state distribution $D_T$, the number corresponding to the state value included in the actual state estimation data generated in step S205 above may be removed (set to zero).

Then, the state distribution generation unit 203 stores the weighted state distribution $D_T$ in the state distribution DB 303 (step S207). Hereinafter, the weighted state distribution $D_T$ is also simply referred to as "state distribution $D_T$" or "state distribution $D_T$ at time step T".

Note that although the state distribution $D_T$ generated in step S203 above is weighted in this embodiment, there is not limitation thereto, for example, the state distribution $D_T$ generated in step S203 above may be stored in the state distribution DB 303 without weighting.

Figure 9:
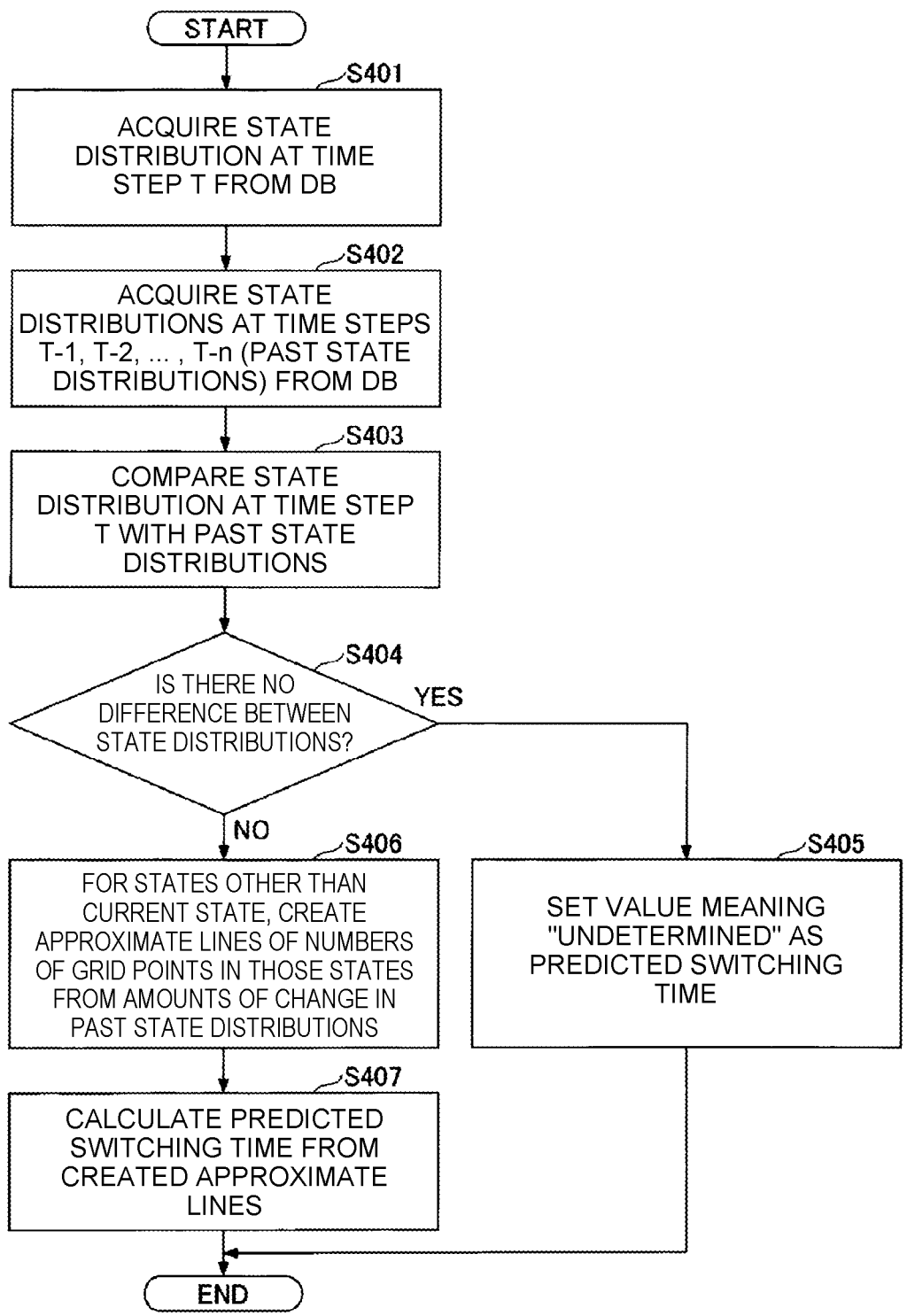
FIG. 9 is a flowchart showing an example of a state switching prediction process according to the first embodiment.

Then, a state switching prediction process for calculating the predicted switching time using the amount of change in the state distribution from the past to the present will be described with reference to FIG. 9. FIG. 9 is a flowchart showing an example of the state switching prediction process according to the first embodiment.

The state switching prediction unit 204 acquires the state distribution $D_T$ at time step T from the state distribution DB 303 (step S401). That is, the state switching prediction unit 204 acquires the current state distribution $D_T$.

Next, the state switching prediction unit 204 acquires each of the state distributions $D_{T-1}, D_{T-2}, \ldots, D_{T-n}$ at time steps T-1, T-2, ..., T-n from the state distribution DB 303 (step S402). That is, the state switching prediction unit 204 acquires the past state distributions $D_{T-1}, D_{T-2}, \ldots, D_{T-n}$.

Next, the state switching prediction unit 204 compares the current state distribution $D_T$ with each of the past state distributions $D_{T-1}, D_{T-2}, \ldots, D_{T-n}$ (step S403).

Next, the state switching prediction unit 204 determines whether there is no difference between the current state distribution $D_T$ and the past state distributions $D_{T-1}, D_{T-2}, \ldots, D_{T-n}$ as a result of the comparison in step S403 above (step S404).

When it is determined in step S404 above that there is no difference (i.e., when all of the state distributions from time step T-n to time T are the same), the state switching prediction unit 204 sets a value meaning "undetermined" as the predicted switching time (step S405).

On the other hand, when it is determined in step S404 above that there is a difference (i.e., when at least one of the state distributions from time step T-n to time T is different), the state switching prediction unit 204 generates, for each state other than the current state, an approximate line that approximates the number of grid points in the state (i.e., the number of grid points associated with the state value representing the state) from the amounts of change of the past state distributions $D_{T-1}, D_{T-2}, \ldots, D_{T-n}$ (step S406). That is, letting z be the number of grid points, the state switching prediction unit 204 generates an approximate line expressed by a function z=f(t) of time step t that approximates the number z of grid points. Note that the approximate line is not limited to a line expressed by a linear function, but may be, for example, a line expressed by a quadratic function, a sine function, or a sigmoid function.

For example, when the state value of the current state is $s_T=0$, the state switching prediction unit 204 generates an approximate line $z=f_1(t)$ of the number of grid points with the state value s=1 and an approximate line $z=f_2(t)$ of the number of grid points with the state value s=2. In this case, it is sufficient for the state switching prediction unit 204 to generate an approximate line $f_1$ that approximates the numbers $M_{T-2}, \ldots, M_{T-n}$ of grid points at time steps T-1, T-2, ..., T-n, respectively, as an approximate line of the number of grid points with the state value s=1. Similarly, it is sufficient to generate an approximate line $f_2$ that approximates the numbers $L_{T-1}, L_{T-2}, \ldots, L_{T-n}$ of grid points at time steps T-1, T-2, ..., T-n, respectively, as an approximate line of the number of grid points with the state value s=2. Note that any technique for obtaining an approximate line from a point group can be used to generate the approximate line. Examples of such a technique include, for example, the least square method.

Note that the approximate lines are generated for the states other than the current state in step S406 above, but, for example, when the transition destination (switching destination) state with respect to the current state has been fixed, only an approximate line for this transition destination state may be generated. In the following, as an example, the description will be continued assuming that the transition destination state with respect to the current state has been fixed to one.

Next, the state switching prediction unit 204 calculates a predicted switching time at time step T from the approximate lines generated in step S406 above (step S407). It is sufficient for the state switching prediction unit 204 to set the time step at which the number of grid points exceeds a predetermined threshold as the predicted switching time at time step T. That is, for example, letting Th be the preset threshold, it is sufficient for the state switching prediction unit 204 to set the minimum t satisfying $f_1(t) \geq Th$ as the predicted switching time at which the current state switches to the state of the state value s=1. The predicted switching time at time step T is stored in, for example, the memory device 106.

Note that although any value can be set as Th, it is conceivable that, for example, $Th=(N_T+M_T+L_T)/2$.

Figure 10:
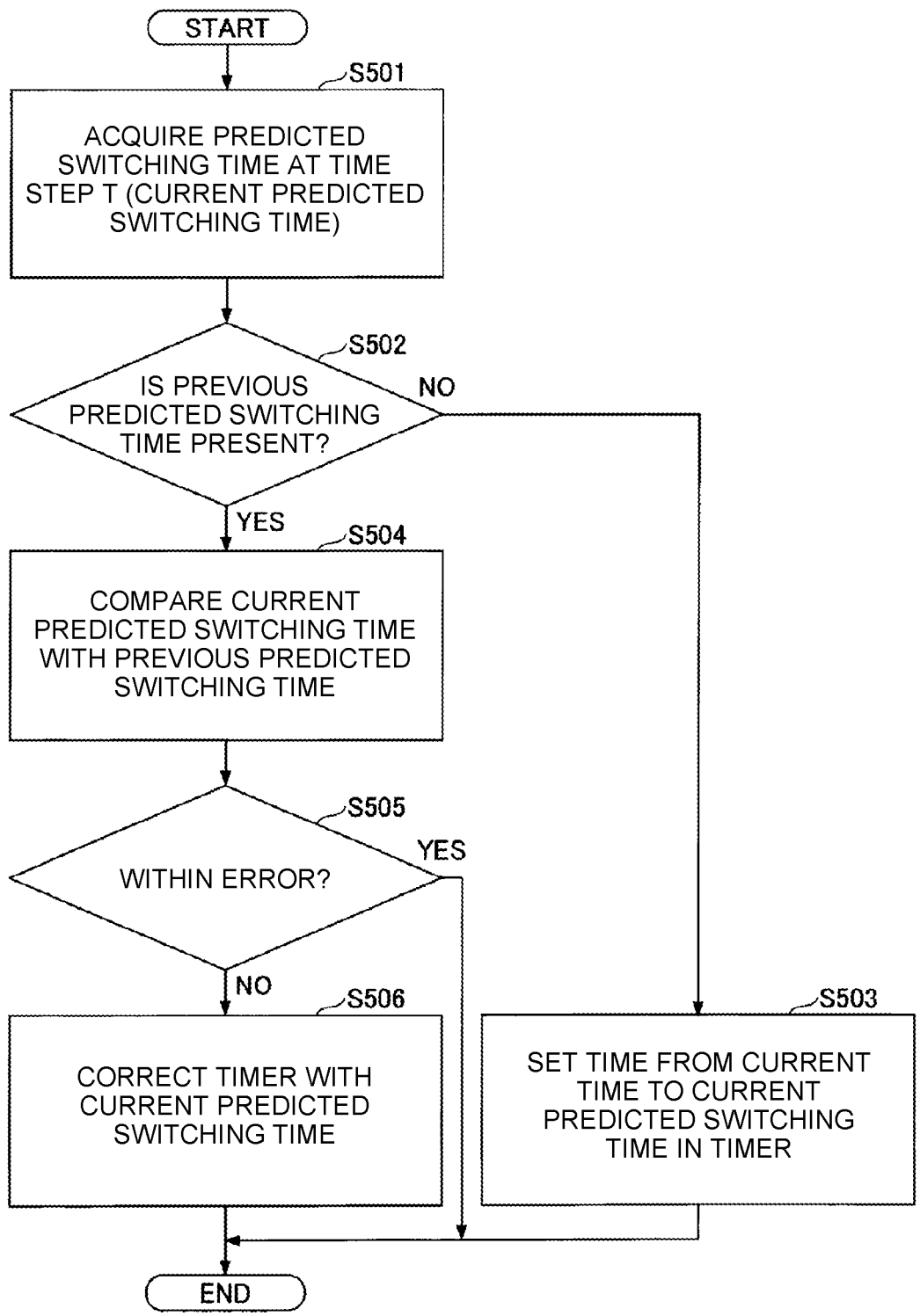
FIG. 10 is a flowchart showing an example of a timer setting process according to the first embodiment.

Then, a timer setting process for setting a timer (i.e., a timer for detecting that the predicted switching time has come) using the predicted switching time calculated above will be described with reference to FIG. 10. FIG. 10 is a flowchart showing an example of the timer setting process according to the first embodiment.

The recognized state switching instruction unit 205 acquires the current predicted switching time (i.e., the predicted switching time at time step T) (step S501).

Next, the recognized state switching instruction unit 205 determines whether the previous predicted switching time (i.e., the predicted switching time at time step T-1) is present (step S502).

When it is not determined in step S502 above that the previous predicted switching time is present (i.e., when the predicted switching time at time step T-1 is not stored in the memory device 106), the recognized state switching instruction unit 205 sets the number of time steps from the current time step T to the predicted switching time at time step T in the timer (step S503). That is, letting T' be the predicted switching time at time step T, the recognized state switching instruction unit 205 sets $\Delta T=T'-T$ in the timer.

On the other hand, when it is determined in step S502 above that the previous predicted switching time is present, the recognized state switching instruction unit 205 compares the current predicted switching time with the previous predicted switching time (step S504).

Next, the recognized state switching instruction unit 205 determines whether the difference between the current predicted switching time and the previous predicted switching time is within a preset error as a result of the comparison in step S404 above (step S505).

When it is not determined in step S505 above that it is within the error, the recognized state switching instruction unit 205 corrects the timer with the current predicted switching time (step S506). For example, the recognized state switching instruction unit 205 may set the above-described $\Delta T$ in the timer, or may set the average or weighted average of the current timer value and $\Delta T$ in the timer.

Figure 11:
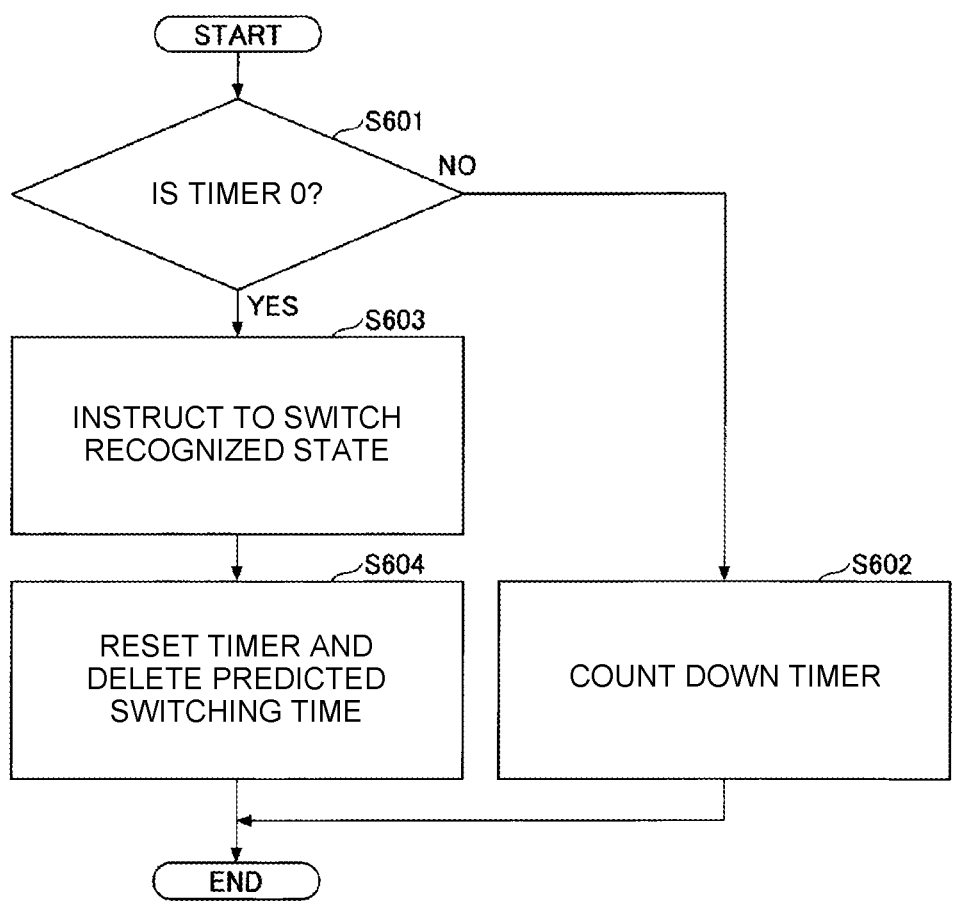
FIG. 11 is a flowchart showing an example of a state switching instruction process according to the first embodiment.

Then, a state switching instruction process for transmitting a state switching instruction to the relay apparatus 20 when the predicted switching time has come using the timer set above will be described with reference to FIG. 11. FIG. 11 is a flowchart showing an example of the state switching instruction process according to the first embodiment. This state switching instruction process is, for example, repeatedly executed for each time step.

The recognized state switching instruction unit 205 determines whether the timer is 0 (step S601).

When it is determined in step S601 above that the timer is not 0, the recognized state switching instruction unit 205 counts down the timer (i.e., subtracts 1 from the value of the timer) (step S602).

On the other hand, when it is determined in step S601 above that the timer is 0, the recognized state switching instruction unit 205 transmits a state switching instruction to switch the recognized state of the relay apparatus 20 (step S603). Thereby, the recognized state of the relay apparatus 20 switches.

Note that it is assumed in this embodiment that the transition destination (switching destination) state with respect to the current state is fixed to one as described above. However, for example, when there are a plurality of transition destination states with respect to the current state, it is sufficient for the recognized state switching instruction unit 205 to transmit a state switching instruction in which the transition destination state is specified to the relay apparatus 20.

Then, the recognized state switching instruction unit 205 resets the timer, and deletes the predicted switching time at each time step from the memory device 106 (step S604).

As described above, in the preparation phase, the state switching support apparatus 10 according to this embodiment uses past communication data and data representing its feature value to generate a grid point list in which the exhaustive data values of the protection target are associated with the states at those times. Then, in the operation phase, the state switching support apparatus 10 according to this embodiment predicts the time at which the state of the protection target switches from the amount of change in the state distribution generated from this grid point list. This makes it possible to obtain the time at which the state of the protection target switches in a short time in the operation phase, and therefore it is possible to reduce the time difference that is a duration until the relay apparatus 20 recognizes the actual state of the protection target.

Second Embodiment

Hereinafter, a second embodiment will be described. The second embodiment will describe a case of further reducing the time difference that is a duration until the relay apparatus 20 recognizes the actual state of the protection target, and also improving the prediction accuracy of the predicted switching time. Note that the second embodiment will mainly describe the differences from the first embodiment, and the description of the same components as those in the first embodiment will be omitted in the second embodiment.

<Functional Configuration>

Figure 12:
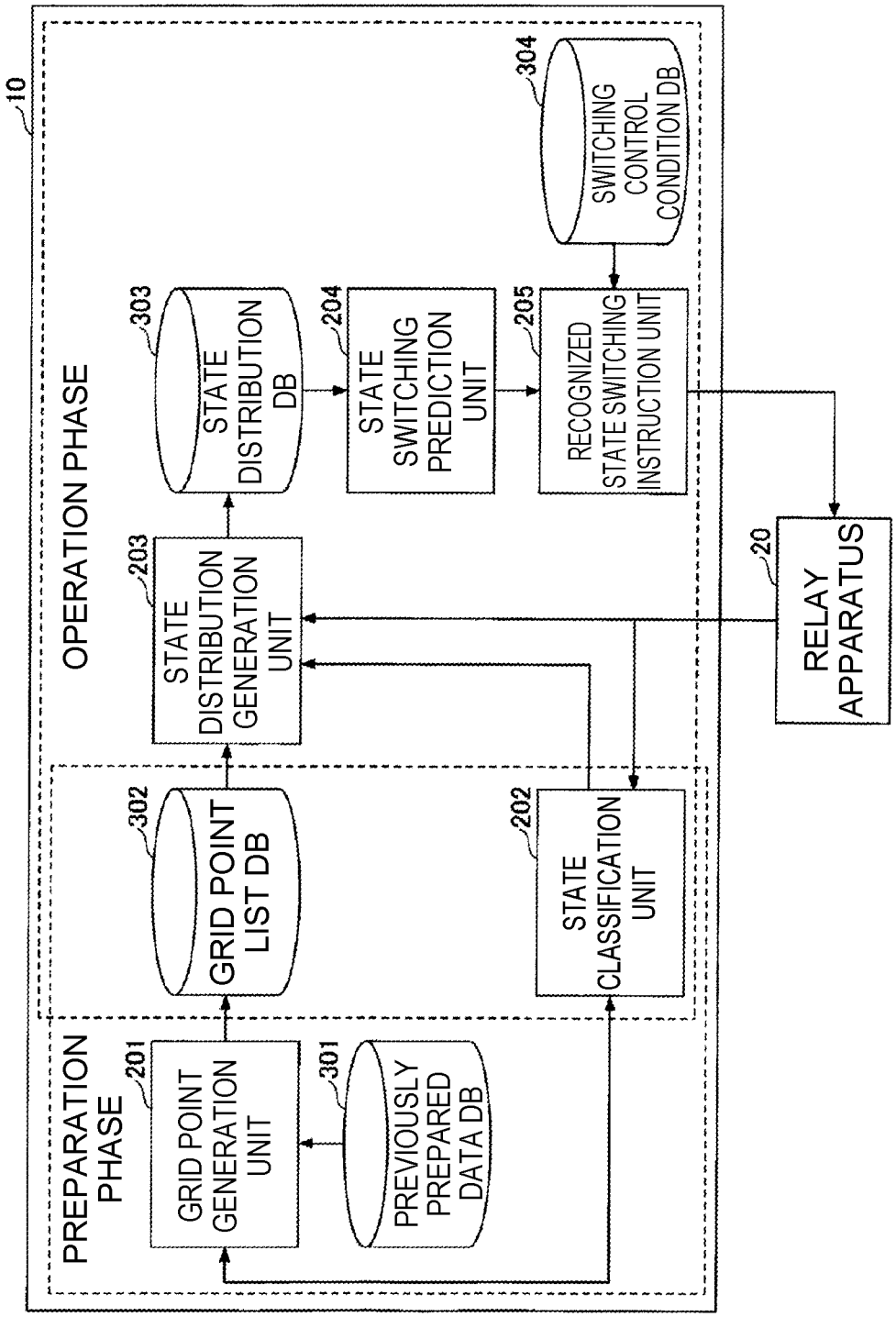
FIG. 12 is a diagram showing an example of a functional configuration of a state switching support apparatus according to a second embodiment.

First, a functional configuration of a state switching support apparatus 10 according to this embodiment will be described with reference to FIG. 12. FIG. 12 is a diagram showing an example of a functional configuration of the state switching support apparatus 10 according to the second embodiment.

As shown in FIG. 12, although the state switching support apparatus 10 according to this embodiment has the same functional units as those in the first embodiment, the state switching prediction unit 204 and the recognized state switching instruction unit 205 have different functions, and the state switching support apparatus 10 according to this embodiment further has a switching control condition DB 304. Note that the switching control condition DB 304 may be implemented using, for example, the memory device 106 or the like, or may be implemented using a storage device connected to the state switching support apparatus 10 via a network (e.g., a database server or the like).

Unlike the first embodiment, the state switching prediction unit 204 does not generate an approximate line that approximates the number of grid points for each time step every time, but calculates the predicted switching time using an approximate line generated in advance. This enables calculation of the predicted switching time in a shorter time in this embodiment.

The recognized state switching instruction unit 205 modifies the predicted switching time using a switching control condition stored in the switching control condition DB 304, and then sets the number of time steps until the modified predicted switching time in the timer. This makes it possible to set a more accurate predicted switching time in the timer. Note that the details of switching control conditions stored in the switching control condition DB 304 will be described later.

<Details of Processes>

Next, the details of processes in the state switching support apparatus 10 according to this embodiment will be described. Note that in this embodiment, the state switching prediction process and the timer setting process are different from those in the first embodiment, and the other processes are the same as those in the first embodiment. Therefore, only the state switching process and the timer setting process will be described below.

Figure 13:
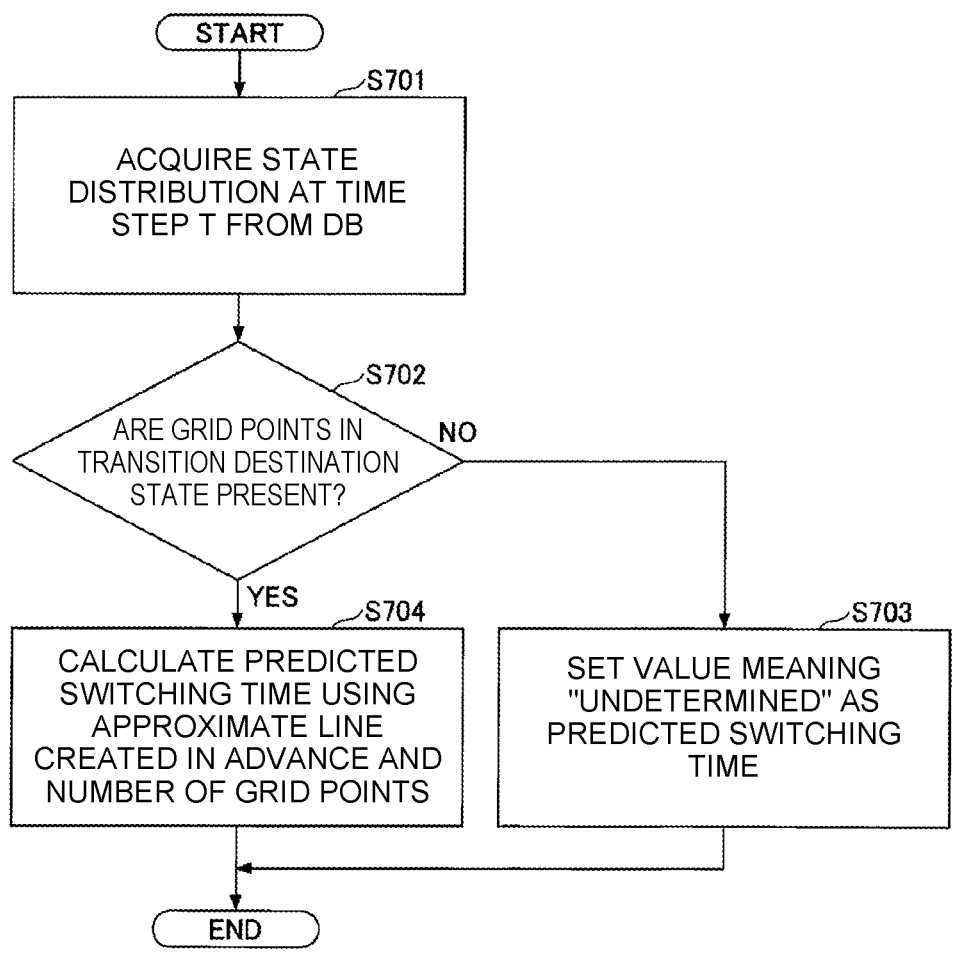
FIG. 13 is a flowchart showing an example of a state switching prediction process according to the second embodiment.

First, the state switching prediction process according to this embodiment will be described with reference to FIG. 13. FIG. 13 is a flowchart showing an example of the state switching prediction process according to the second embodiment.

The state switching prediction unit 204 acquires the state distribution $D_T$ at time step T from the state distribution DB 303 (step S701).

Next, the state switching prediction unit 204 determines whether the number of grid points in the transition destination state from the current state is present (i.e., it is not 0) in the state distribution $D_T$ acquired in step S701 above (step S702).

When the number of grid points in the transition destination state is not present in step S702 above (i.e., when the number of grid points is zero), the state switching prediction unit 204 sets a value meaning "undetermined" as the predicted switching time (step S703).

On the other hand, when the number of grid points in the transition destination state is present in step S702 above (i.e., when the number of grid points is not zero), the state switching prediction unit 204 calculates the predicted switching time using the number of grid points in the transition destination state and the approximate line generated in advance (step S704). That is, when the approximate line corresponding to the transition destination state is expressed as $z=f(t)$, the state switching prediction unit 204 substitutes the number of grid points in the transition destination state for z to calculate t, thereby calculating the predicted switching time. Here, the function f expressing such an approximate line is prepared in advance in the preparation phase using the previously prepared data by means of the same method as that described in step S406 of FIG. 9. This enables calculation of the predicted switching time in a shorter time because it is not necessary to generate the approximate line every time unlike the first embodiment.

Here, before the timer setting process according to this embodiment is described, the switching control conditions stored in the switching control condition DB 304 will be described with reference to FIG. 14. FIG. 14 is a diagram showing an example of the switching control conditions stored in the switching control condition DB 304.

As shown in FIG. 14, one or more switching control conditions are stored in the switching control condition DB 304. Each switching control condition includes, for example, "TRANSITION SOURCE", "TRANSITION DESTINATION", "TIMING", "NUMBER OF SHIFTS", "ALLOWABLE ERROR", and "COMMAND". Note that these switching control conditions are, for example, generated by a user and stored in the switching control condition DB 304.

The transition source state and the transition destination state are set in "TRANSITION SOURCE" and "TRANSITION DESTINATION", respectively. The timing of transmitting a state switching instruction when switching the recognized state of the relay apparatus 20 is set in "TIMING". How much the timing of transmitting a state switching instruction when switching the switching state of the relay apparatus 20 is shifted from the predicted switching time is set in the "NUMBER OF SHIFTS".

For example, when "BEFORE SWITCHING" is set in "TIMING" and "50" is set in "NUMBER OF SHIFTS", this means that a state switching instruction is transmitted 50 time steps before the predicted switching time. Similarly, for example, when "AFTER SWITCHING" is set in "TIMING" and "100" is set in "NUMBER OF SHIFTS", this means that a state switching instruction is transmitted 100 time steps after the predicted switching time. On the other hand, for example, when "ON TIME" is set in "TIMING", this means that a state switching instruction is transmitted at the predicted switching time.

When there is a difference in the predicted switching time between time step T and time step T-1, its allowable error is set in "ALLOWABLE ERROR". A command to switch the rule on the side of the relay apparatus 20 is set in the "COMMAND".

Note that the switching control conditions described above are an example, and the switching control conditions may include various types of information other than "TRANSITION SOURCE", "TRANSITION DESTINATION", "TIMING", "NUMBER OF SHIFTS", "ALLOWABLE ERROR", and "COMMAND". Further, these switching control conditions can be appropriately added, deleted, or modified by a user.

Figure 15:
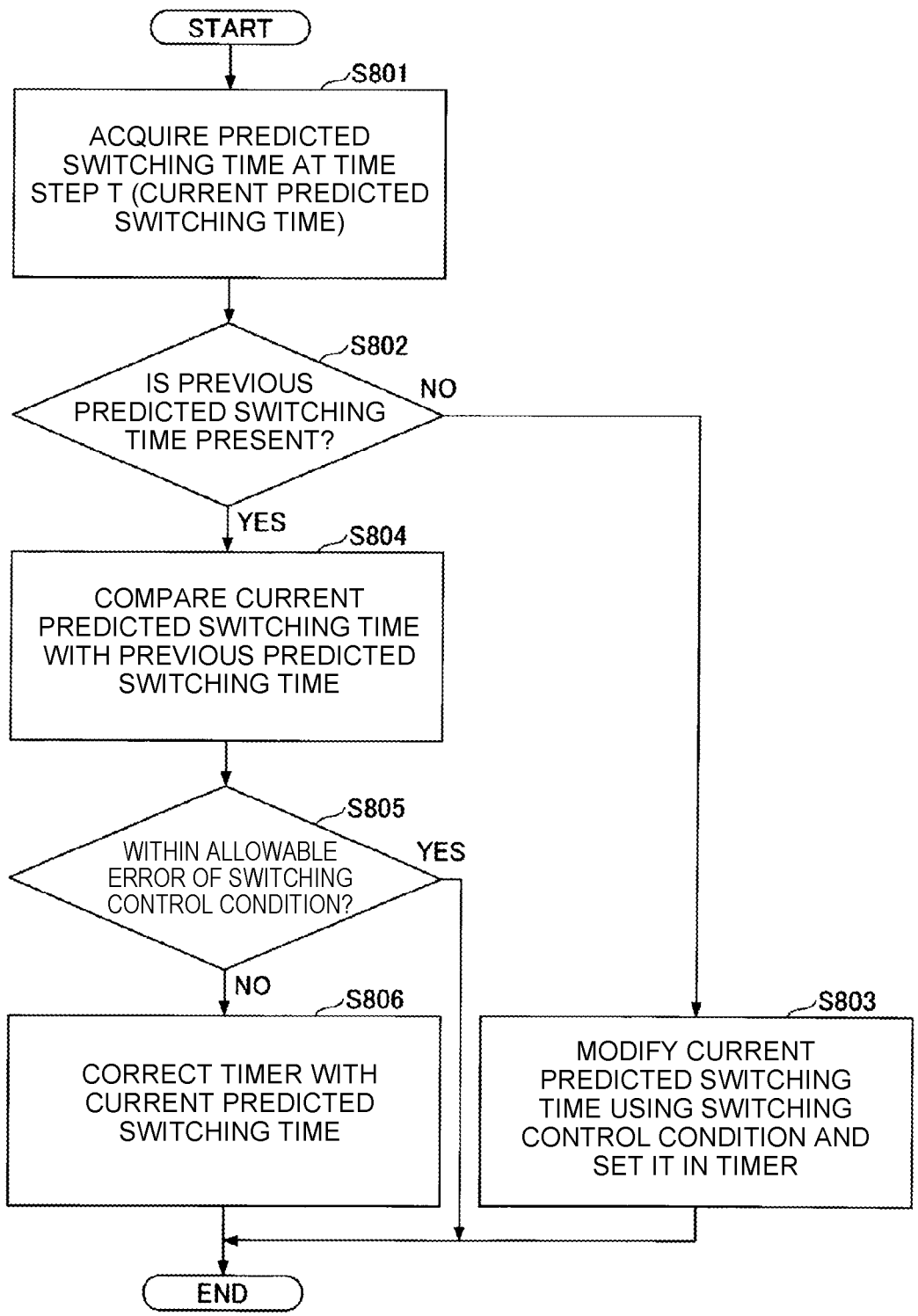
FIG. 15 is a flowchart showing an example of a timer setting process according to the second embodiment.

Then, the timer setting process according to this embodiment will be described with reference to FIG. 15. FIG. 15 is a flowchart showing an example of the timer setting process according to the second embodiment.

The recognized state switching instruction unit 205 acquires the current predicted switching time (i.e., the predicted switching time at time step T) (step S801).

Next, the recognized state switching instruction unit 205 determines whether the previous predicted switching time (i.e., the predicted switching time at time step T-1) is present (step S802).

When it is not determined in step S802 above that the previous predicted switching time is present (i.e., when the predicted switching time at time step T-1 is not stored in the memory device 106), the recognized state switching instruction unit 205 modifies the predicted switching time at time step T using the timing and the number of shifts included in the corresponding switching control condition, and then sets the time steps until this modified predicted switching time in the timer (step S803). That is, the recognized state switching instruction unit 205 first identifies the switching control condition in which the current state and the transition destination state are set in "TRANSITION SOURCE" and "TRANSITION DESTINATION", respectively, among the switching control conditions stored in the switching control condition DB 304. Next, the recognized state switching instruction unit 205 modifies the predicted switching time according to the information set in "TIMING" and "NUMBER OF SHIFTS" of the identified switching control condition, and then sets the number of time steps ΔT from time step T to the modified predicted switching time in the timer. Thereby, the number of time steps modified by the corresponding switching control condition is set in the timer.

On the other hand, when it is determined in step S802 above that the previous predicted switching time is present, the recognized state switching instruction unit 205 compares the current predicted switching time with the previous predicted switching time (step S804).

Next, the recognized state switching instruction unit 205 determines whether the difference between the current predicted switching time and the previous predicted switching time is within the allowable error set in "ALLOWABLE ERROR" of the corresponding switching control condition as a result of the comparison in step S804 above (step S805).

When it is not determined in step S805 above that it is within the error, the recognized state switching instruction unit 205 corrects the timer with the current predicted switching time as in step S506 of FIG. 10 (step S806).

As described above, the state switching support apparatus 10 according to this embodiment calculates the predicted switching time using an approximate line generated in advance in the operation phase, and also modifies the predicted switching time according to switching control conditions generated in advance by a user. This makes it possible to further reduce the time difference that is a duration until the relay apparatus 20 recognizes the actual state of the protection target, and also improve the prediction accuracy of the predicted switching time.

The present invention is not limited to the above embodiments disclosed specifically, and various variations and modifications, combinations with known techniques, and the like can be made without departing from the description in Claims.

REFERENCE SIGNS LIST

1 Communication control system
10 State switching support apparatus
20 Relay apparatus
30 Terminal
101 Input device
102 Display device
103 External I/F
103a Recording medium
104 Communication I/F
105 Processor
106 Memory device
107 Bus
201 Grid point generation unit
202 State classification unit
203 State distribution generation unit
204 State switching prediction unit
205 Recognized state switching instruction unit
301 Previously prepared data DB
302 Grid point list DB
303 State distribution DB
304 Switching control condition DB

The invention claimed is:

1. A communication control system comprising:
a state switching support predictor that includes a memory and a processor; and
a communication controller that includes a memory and a processor configured to control communication to a protection target according to a state of the protection target,
wherein the processor of the state switching support predictor is configured to execute:
generating grid point data in which a grid point group representing exhaustive communications to the protection target is associated with states corresponding to grid points of the grid point group using previously collected data related to the communication;
generating, by using the grid point data and data related to current communication, a state distribution representing a distribution of the states in a vicinity of a point represented by the data related to current communication in the grid point group included in the grid point data;
predicting a time at which the state transitions to another state from a change in the state distribution from past to present; and
transmitting an instruction to switch the state to the communication controller at the predicted time.

2. The communication control system according to claim 1, wherein the data related to the communication is communication data transmitted and received by the protection target, feature value data representing a feature value of the communication data, data including the communication data and the feature value data, or data obtained by dimensionally compressing the data including the communication data and the feature value data.

3. The communication control system according to claim 1, wherein the generating of the state distribution calculates a number of grid points included in the vicinity of the point represented by the data related to current communication in the grid point group for each of the states, and generates the calculated number for each of the states as the state distribution, and
the predicting predicts a time at which the state transitions to another state from a change in the number for each of the states included in the state distribution from past to present.

4. The communication control system according to claim 1, wherein the processor of the state switching support apparatus is further configured to:

generate the grid point data wherein the grid point group is associated with states estimated by the estimating from data representing the grid points of the grid point group.

5. The communication control system according to claim 4, wherein the state distribution is generated by weighing the state distribution using the data related to current communication and the state estimated by the estimating from the data related to current communication.

6. A state switching support apparatus connected to a communication control apparatus that includes a memory and a processor configured to control communication to a protection target according to a state of the protection target, the state switching support apparatus comprising:

a memory; and a processor configured to execute:

generating grid point data in which a grid point group representing exhaustive communications to the protection target is associated with states corresponding to grid points of the grid point group using previously collected data related to the communication;

generating, by using the grid point data and data related to current communication, a state distribution representing a distribution of the states in a vicinity of a point represented by the data related to current communication in the grid point group included in the grid point data;

predicting a time at which the state transitions to another state from a change in the state distribution from past to present; and transmitting an instruction to switch the state to the communication control apparatus at the predicted time.

7. A state switching support method executed by a state switching support apparatus that includes a memory and a processor, and is connected to a communication control apparatus that includes a memory and a processor configured to control communication to a protection target according to a state of the protection target, the state switching support method comprising:

generating grid point data in which a grid point group representing exhaustive communications to the protection target is associated with states corresponding to grid points of the grid point group using previously collected data related to the communication;

generating, by using the grid point data and data related to current communication, a state distribution representing a distribution of the states in a vicinity of a point represented by the data related to current communication in the grid point group included in the grid point data;

predicting a time at which the state transitions to another state from a change in the state distribution from past to present; and transmitting an instruction to switch the state to the communication control apparatus at the predicted time.

8. A non-transitory computer-readable recording medium having computer-readable instructions stored thereon, which when executed, cause a computer including a memory and a processor to perform the state switching support method according to claim 7.

* * * * *